Figure 1:
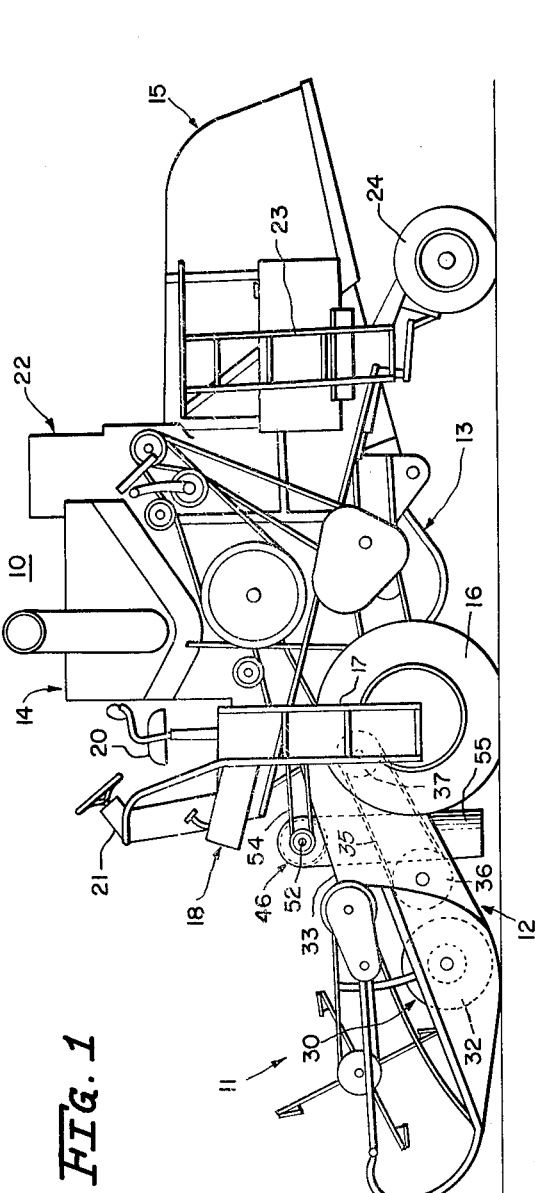

Oct. 26, 1965  N. O. OLSSON  3,213,598

DUST DISPERSAL FAN

Original Filed Dec. 4, 1961

INVENTOR.
Nils O. Olsson
Paul O. Pippel
Atty.

United States Patent Office 3,213,598
Patented Oct. 26, 1965

1

3,213,598
DUST DISPERSAL FAN
Nils O. Olsson, Hamilton, Ontario, Canada, assignor to International Harvester Company, Chicago, Ill., a corporation of New Jersey
Continuation of abandoned application Ser. No. 156,818, Dec. 4, 1961. This application Mar. 9, 1965, Ser. No. 441,403
3 Claims. (Cl. 56—20)

This is a continuation of application Serial No. 156,818, filed December 4, 1961, now abandoned.

The present invention is directed to a structure for protecting the operator of agricultural equipment from the hazards to health and vision produced as the equipment is moved through a field, and more particularly to a combine which includes novel means for removing the dust and dirt from the forward and intermediate portions of the combine and discharging such particles at a location remote from the operator's work station to protect the operator from the abrasive crop particles and provide optimum vision for the operator in directing the equipment through the field.

The hazards to health and to good vision of the opertor of a combine are well-known to those who have utilized or seen such equipment harvesting and threshing grain in a field. The grain must be fairly dry before this operation can be commenced, or else a pasty material can be produced as the combine moves through the field. However, when the grain is sufficiently dried to afford the proper conditions for harvesting and threshing, an apppreciable quantity of dust is produced as the grain is cut or picked up from the windrows, fed through an undershot conveyor to the thresher, and then processed between the cylinder and the concave. Dust is produced between the knife and the blade assembly as the crop is harvested, at the platform auger as the crop is gathered centrally, and along the conveyor as the crop is moved upwardly to the concave. Additional dust is blown into the conveyor or feeder shell by the turbulence produced through the motion of the threshing cylinder. In addition, the soil in certain fields is more conducive to the production of dust during the operation of the combine and all these conditions are causes of the obvious hazards to the health as well as the optimum vision of the combine operator.

It is therefore a primary object of the present invention to produce an agricultural crop processing machine, such as a combine, in which the health and visibility hazards occasioned by dust are minimized.

It is a more specific object of the invention to provide such an arrangement with means for gathering the dust generated as the crop is processed, and discharging the dust at a location remote from the operator's station, thus to afford the operator optimum protection.

The foregoing and other objects of the invention are achieved, in a preferred embodiment, by the provision of a fan or blower unit adjacent the feeder shell, connected to the interior of the shell by an entrance aperture. The fan can be driven by a belt drive coupled to any of the many sheaves, such as a sheave coupled to the shaft on which the upper end of the undershot conveyor is journalled, which are normally rotated during operation of the various combine elements. With this configuration the dust is withdrawn from the feeder shell and expelled through a discharge duct at a point below the feeder shell near the right front tire of the combine, so that the dust is blown away from the operator's work position. With such an arrangement the health and visibility hazards described above are minimized.

Figure 2:
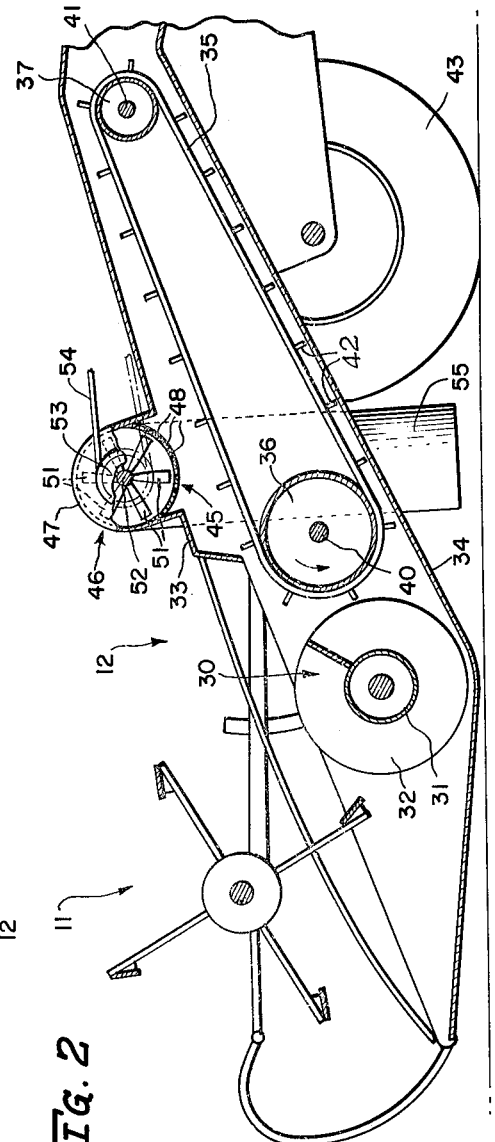

The best mode contemplated for carrying out the invention will now be described. To enable those skilled in the art to make and use the invention, such description is set forth in connection with the accompanying drawing, in the two figures of which like reference numerals identify like elements, and in which:

FIGURE 1 is a side view of a combine in which a preferred embodiment of the invention has been incorporated; and FIGURE 2 is a side view having the left side panel partially broken away, taken on an enlarged scale, illustrating in greater detail the incorporation of an embodiment of the invention with known combine elements.

Structure of the invention

As shown in FIGURE 1, among the major assemblies of a combine 10, are a front harvester portion 11, a conveying portion 12 for carrying harvested or cut grain rearwardly toward a central processing portion 13, over which is disposed a grain storage tank 14, and a rear discharge portion 15 through which the undesired portions of the crop are either discharged directly or first processed, such as being more finely subdivided, and then discharged rearwardly onto the ground. Other well-known components include a front wheel 16, the other one of which is not visible in this view, a mounting ladder 17 for providing access toward an operator's platform 18 on which a chair 20 and a steering column 21 are mounted, an engine unit 22 mounted just at the rear of grain storage tank 14, a rear access ladder 23 for providing access to the engine area, and one of the rear wheels 24. Those skilled in the art will recognize that the conveying portion 12 does not have the configuration conventionally associated with this unit. A more detailed structural description of the invention will be set forth in connection with FIGURE 2.

As there shown, the left side panel has been removed to portray certain conventional elements of a combine conveying arrangement, thereby to more accurately depict the orientation of the present invention with respect to the known elements of the combine. Such elements include, at the rear of harvesting portion 11, an auger arrangement 30 including a central core 31 and screw flights 32. The feeder shell itself includes an upper panel 33, a lower panel 34 and a pair of interconnecting side panels 60 between which a pair of conveying chains 35 (only one of which is visible) are supported and journalled on a pair of oppositely disposed drums 36 and 37. Drums 36 and 37 are respectively journalled on shafts 40 and 41, and in a well-known manner one of these shafts, such as shaft 41, is positively driven to afford movement of both drums 36 and 37 in a counterclockwise direction and effect an undershot operation of the conveyor assembly including chains 35 and a plurality of slats 42 mounted thereon transversely with respect to the path of travel of the chains. The upper run of the undershot conveyor is designated 61 and the lower run is designated 62. This operation is in accordance with well-known principles, in which the grain is normally cut or picked up from the windrow and then moved centrally by the auger 30, to be carried by the undershot conveyor arrangement just described upwardly toward the cylinder and concave.

The right front wheel 43 is illustrated to indicate the orientation of the feeder shell in FIGURE 2.

In accordance with the inventive concept, upper panel 33 is formed to define a transversely extending intake opening or an entrance aperture 45 to provide for connection between the interior of the feeder shell and the interior of an axial fan unit 46. The fan or air-movement means includes a substantially cylindrical housing 47 displaced transversely across the feeder shell as indicated, with the bottom sheet 63 of housing 47 apertured at a plurality of locations, such as those referenced by numeral 48, to provide for communication between the interior of the fan chamber and the interior of the feeder shell. A plurality of fan blades 51 are affixed to a central shaft 52, supported in bearing fashion from the side panels of the feeder shell housing. A sheave or pulley 53 is affixed to one end of shaft 52, and coupled by a suitable belt 54 to any of the driven cylinders or shafts in the entire combine arrangement, such as shaft 41. Because there are a multiplicity of sources from which the rotation of power can be derived, the illustrative means for providing rotation of the fan unit, such as the belt and sheave means, are given by way of illustration only and in no sense by way of limitation.

At the right side of the combine, a discharge chute 55 is connected at its upper end with the interior of the fan chamber and its bottom portion defines an exit aperture, to blow any dust down between the right front tire and the feeder platform. In many combines, such as certain models manufactured by the assignee of the present invention, the operator's platform 18 is situated at the upper left portion of the combine to provide good visibility for the operator when controlling the machine in the harvesting-threshing operation, and likewise to afford good visibility and control during transport of the combine when it is necessary to traverse roads and highways. Accordingly the dust is blown downwardly at a point remote from the operator's location.

*Operation of the invention*

When the crop in a given field is sufficiently dried, a combine is brought into the field for harvesting in a well-known manner. As noted above, the condition requisite for good harvesting and threshing operations are also conducive to the formation of dust and dirt particles. The moving elements of the combine create a moving current of dust and dirt particles, particularly in the area of the feeder shell after the crop is cut and is being transported by the auger unit to the undershot conveyor arrangement and passed downwardly toward the cylinder and the concave.

In accordance with the present invention, the fan unit 46 sucks in dust, crop particles and heavier dirt particles, which are caused to move in the vicinity of the auger 30 as the crop is displaced from either side of the platform centrally thereof toward the undershot conveyor. The fan further sucks in the undesired abrasive and dust particles which are blown into the feeder and the conveyor shell by the turbulence created around the threshing cylinder, inasmuch as there is only a slight clearance between the cylinder and the concave with the consequent generation of air currents during the threshing operation to displace dust particles from the processing portion of the combine into the feeder shell. The dust and dirt particles are sucked in through apertures 48 and displaced axially through the chamber defined by housing 47. The entrained particles are blown downwardly at the right side of the fan unit 46 out through the exit aperture of the discharge chute 55, adjacent the right front tire and beneath the feeder shell. If there is no wind, or a head wind, the breeze carries these particles rearwardly so that they do not cause any discomfort or impairment of vision of the operator. With a transverse breeze from left to right, the dust particles are also positively displaced away from the operator of the combine. If the breeze is from right to left, if it is strong enough to displace the ejected dirt particles transversely of the feeder shell at a rate exceeding the forward progress of the combine, it is also strong enough to completely remove the dust and dirt particles from the area in which they can irritate or obscure the vision of the combine operator. Those skilled in the art will recognize that the particular location of the fan unit itself, and of the discharge chute, can be varied to suit any desired conditions, especially in relation to movement of the operator's platform 18 from one to the other side of the combine. By practice of the invention the entrance of abrasive particles into the lungs of the combine operator is substantially obviated, thereby greatly reducing the danger to health heretofore always present in such operations, and simultaneously the vision of the operator is improved significantly so that proper and accurate control of the combine during the harvesting and threshing operations is more readily maintained.

While only a preferred embodiment of the invention has been described and illustrated, it is apparent that modifications and alterations may be made therein, and it is the intention in the appended claims to cover all such modifications and alterations as may fall within the true spirit and scope of the invention.

What is claimed is:

1. In a combine of the type having a harvesting unit, a threshing unit, a feeder housing including an upper panel, a lower panel and a pair of interconnecting side panels, and an operator's platform, the improvement therein which comprises: a transversely extending intake opening formed in the upper panel of said feeder housing, a fan housing mounted on the exterior of said feeder housing such that it overlies and covers said opening formed in said panel, said fan housing including a bottom sheet defining the lower extent of said fan housing, said bottom sheet having apertures formed therein through which air is permitted to flow from the interior of said feeder housing to the interior of said fan housing, the entire fan housing, including said bottom sheet, being substantially confined exteriorly of said feeder housing such that it does not extend through said intake opening into the interior of said feeder housing, a discharge duct connected to said fan housing and terminating at a point remote from said operator's platform, a fan mounted within the interior of said fan housing, and means connected to said fan for actuating the same to withdraw air and dust particles from the feeder housing into the fan housing through the apertures formed in said bottom sheet and discharge the air and dust particles through said discharge duct.

2. A feeder housing for a combine including an upper panel, a lower panel and a pair of interconnecting side panels, an undershot conveyor, having an upper and lower run, mounted within said feeder housing, the lower run being adapted to carry material along the upper surface of said lower panel, an unobstructed space between the upper run of said undershot conveyor and said upper panel in which dust gathers and through which material tangled with said undershot conveyor passes, a transversely extending intake opening formed in the upper panel of said feeder housing, a fan housing mounted only on the exterior of said feeder housing such that it overlies and covers said opening formed in said panel such that air is permitted to flow from the interior of said feeder housing to the interior of said fan housing, the entire fan housing being confined exteriorly of said feeder housing such that it does not extend through said intake opening into the interior of said feeder housing, a discharge duct connected to said fan housing, a fan mounted within the interior of said fan housing, and means connected to said fan for actuating the same to withdraw air and dust particles from the feeder housing into the fan housing through said transversely extending intake opening and discharge the air and dust partcles through said discharge duct.

3. In a combine of the type having a harvesting unit, a threshing unit, a feeder housing including an upper panel, a lower panel and a pair of interconnecting side panels, and an operator's platform, the improvement therein which comprises: an undershot conveyor, having an upper and lower run, mounted within said feeder housing, the lower run being adapted to convey material along the upper surface of said lower panel, an unobstructed space between the upper run of said undershot conveyor and said upper panel in which dust gathers and through which material tangled with said undershot conveyor passes, a transversely extending intake opening formed in the upper panel of said feeder housing, a fan housing mounted on the exterior of said feeder housing such that it overlies and covers said opening formed in said panel, said fan housing including a bottom sheet defining the lower extent of said fan housing, said bottom sheet having apertures formed therein through which air is permitted to flow from the interior of said feeder housing in the interior of said fan housing, the entire fan housing, including said bottom sheet, being substantially confined exteriorly of said feeder housing such that it does not extend through said intake opening into the interior of said feeder housing, a discharge duct connected to said fan housing and terminating at a point remote from said operator's platform, a fan mounted within the interior of said fan housing, and means connected to said fan for actuating the same to withdraw air and dust particles from the feeder housing into the fan housing through the apertures formed in said bottom sheet and discharge the air and dust particles through said discharge duct.

No references cited.

ABRAHAM G. STONE, *Primary Examiner.*

ANTONIA F. GUIDA, *Examiner.*